Oct. 12, 1926.

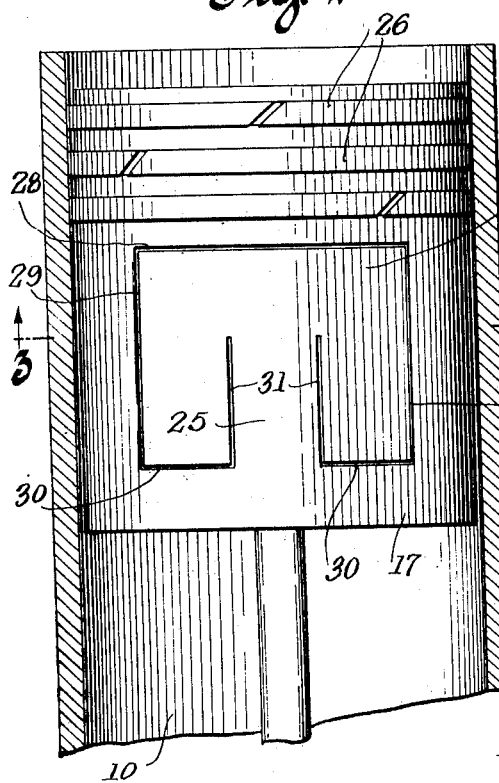

C. Y. KNIGHT 1,602,797

ENGINE PISTON AND PISTON ROD ASSEMBLY

Filed June 8, 1923      2 Sheets-Sheet 2

INVENTOR
Charles Y. Knight
BY
Chester H. Braselton
ATTORNEY

Patented Oct. 12, 1926.

1,602,797

UNITED STATES PATENT OFFICE.

CHARLES Y. KNIGHT, OF PASADENA, CALIFORNIA, ASSIGNOR TO KNIGHT & KILBOURNE DEVELOPMENT CO., OF CHICAGO, ILLINOIS, A CORPORATION OF ILLINOIS.

ENGINE PISTON AND PISTON-ROD ASSEMBLY.

Application filed June 8, 1923. Serial No. 644,104.

The present invention, while relating to a certain broader combination of means for automatically taking up the clearance between a piston and wall within which a piston moves, also relates to a constructional improvement upon my previous application Serial No. 619,928 for means for holding piston against vibration at end of stroke, filed February 5, 1923, which application relates to a broad novel means in connection with the reciprocating piston whereby lateral movement or tendency for lateral movement or piston slap at the ends of the stroke of the piston in its cycle of movement is prevented, counteracted, or eliminated, the construction, however, allowing free travel between the ends of the piston stroke.

An object of the present invention is to provide a simplified construction for accomplishing these ends by which the piston rod end need not be machined to any particular dimension; no alteration of the existing construction of the piston rod other than the provision for an insert as necessary and wherein no tooling or measuring in replacement cases is required which might otherwise be necessary as the mechanism wears in use, as replaceable cam element of the correct design may be made in various fractional sizes and supplied as needed.

Thus, an object of the present invention relates to a constructional means for accomplishing the objects indicated as by use of a removable actuating insert or element which is automatically maintained in place by the several coacting parts and to provide a structure of this kind in which the inserts referred to may be made as stated, in various sizes and shapes to also vary the resultant action of steadying the piston at the ends of its strokes as heretofore indicated.

A further object of the invention relates broadly to a means, by reason of the employment of the separable part which may be made in various sizes or shimmed or otherwise modified, to be used as needed, to avoid reboring of piston cylinders or the replacement of new pistons as any wear takes place in the continued use of the engine.

A further object is to provide an efficient structure in which the cam insert operates against a roller on the movable part of the piston to avoid unnecessary friction and provide an arrangement particularly satisfactory in use.

Various other objects are within the scope of this invention, such as relate to the arrangement of the different elements of the structure and the various economies of manufacture and numerous other features as will be apparent from a consideration of the drawings and related description of a form of the invention which may be preferred, in which Figure 1 is a vertical sectional view showing one embodiment of the invention;

Figure 2 is a similar sectional view taken at right angles to Figure 1 showing also the crank rod wrist pin and crank shaft of the engine;

Figure 3 is a horizontal section taken on a line 3—3 of Figure 1;

Figure 3ª is a plan and side elevation of the circular metal inserts which may be used.

Figure 4:
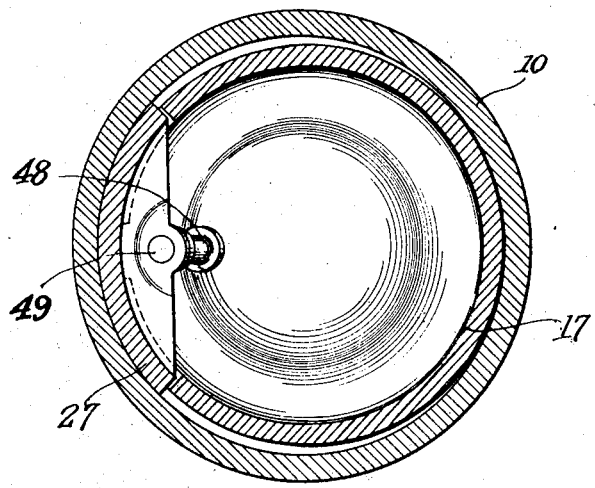
Figure 5:
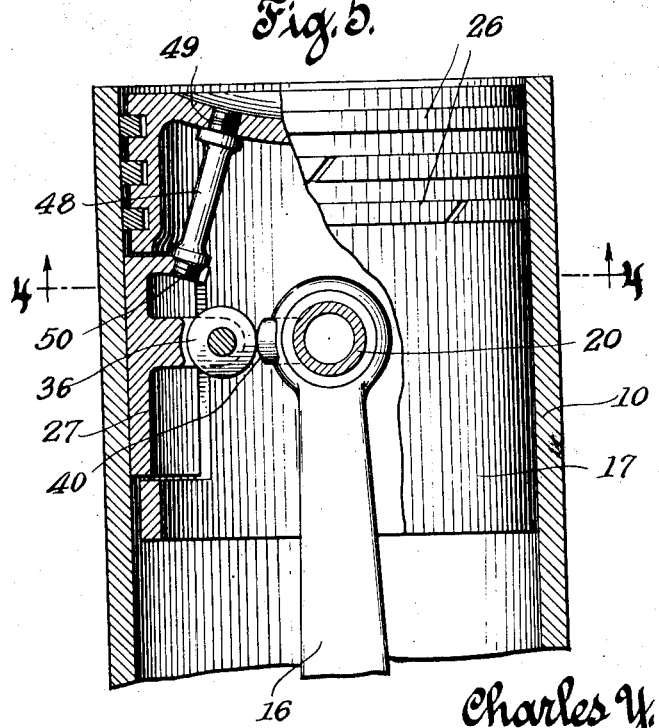

Figure 4 is a sectional view on the line 4—4 of Figure 5; and

Figure 5 is a vertical view similar to Figure 2 showing a modified embodiment of the present invention.

Referring to Figures 1, 2 and 3 it will be seen that in this embodiment of the invention it is shown as applied to an engine having a cylinder 10, a crank shaft 12, a crank 14, piston rod 16, which is coupled to the piston 17, by means of the wrist pin 20, which in turn is carried by trunnions 22 and 24 formed integral with the piston 17. A plurality of piston rings 26 are provided in the usual manner. The piston in this instance, is provided with a movable element or gate portion 27, adapted to be forced into engagement with the cylinder 10 at the ends of the piston strokes as will appear and is formed in this embodiment of the invention, by providing a transverse slit 28, two outside longitudinal kerfs 29, the two bottom horizontal cuts 30 which are connected to the upwardly inwardly extending kerfs 31 to form the integral tongue hinge 25. By this construction it will be seen that the gate 27 may be sprung out or spread in a more or less horizontal direction with respect to the axis of the piston and is integral with the piston skirt, thus avoiding any hammering action at the joint between the movable part and the rest of the piston where the hinge is so far from the free edge as to cause considerable travel thereof with sufficient angularity to cause such result. Moreover a spacer in this instance is unnecessary to take up the material lost in the saw cuts 28, 29, 30 and 31, which might likewise be otherwise necessary where the movement of the movable gate causes a considerable opening at the top and bottom of the piston strokes.

The central portion of the gate 27 is provided with an inwardly extending integrally cast lug 32 which is cut away as indicated at 33 to form spaced trunnions 34 and 35 in which is mounted a suitable roller 36 adapted to be engaged by a cam element connected with the piston rod to push the gate 27 into solid engagement with the cylinder 10 as will hereinafter appear.

In the present embodiment of the invention certain of the objects heretofore indicated are accomplished by providing merely a recess 38 in the end of the piston rod 16 which is preferably cut deep enough to extend entirely to the wrist pin 20. A removable steel concavo-convex insert or button 40 is located in the recess 38 so as to engage the roller 36 and is held in place with the concave surface 41 thereof in contact with the wrist pin 20 by the engagement of the convex surface 42 with the roller 36. The location of the insert 40 and the contour given the convex surface 42 is such as to normally permit free movement of the piston in the cylinder 10 intermediate the ends of its stroke but to cause a spreading of the gate 27 at each end thereof by the engagement at these points of the higher portions of the cam 40 with the roller 36 as will be understood from the foregoing and from the disclosure of the drawing as well as by my copending application, supra.

It will thus be seen that the piston rod itself need not be modified or machined to any particular size or arranged to hold the insert in place as the roller 36 always holds the insert 40 against the wrist pin 20 and therefore the operating cam may be applied to existing piston rods without accurate measurement or alteration other than merely providing the opening 38. Moreover it is apparent that the insert may be made of various sizes to obtain varying results and in case of wear a new insert may be placed on the wrist pin 20 in the opening 38 without requiring any tooling or measuring in such replacement cases, the construction thus providing these and many other practical advantages.

It is also apparent that the present invention provides means which may automatically be used to take up the ordinary wear between piston and cylinder irrespective of the spreading action at the top and bottom of the piston strokes. Thus, a slightly larger insert 40 may be used to move the gate 27 normally a sufficient distance outwardly to take up for wear and at the same time also operate and function as heretofore described at the top and bottom of the piston strokes. This will avoid entirely the reboring of cylinders and the use of new pistons as buttons of various sizes may be made and applied as required. It is apparent also that instead of employing entirely new button 40 a thin shim may be used and inserted between the wrist pin 20 and the bottom of the button or insert 40.

In the embodiment of the invention illustrated in Figs. 4 and 5 the gate 27 is entirely separate from the piston 17 and is suitably located in position as by being hung from the top of the piston by the connecting member 48. In this instance I have illustrated the same as being screw-threaded into the top of the piston 17 and as likewise provided with screw-threads 50 for engagement with the movable gate 27. The roller 36 and the insert 40 are otherwise the same as described in the embodiment of the invention illustrated in Figs. 1, 2 and 3.

It is apparent that within the spirit of the invention modifications and different arrangements may be made other than as herein disclosed, and the present disclosure is illustrative merely, the invention comprehending all variations thereof.

Having thus described my invention what I desire to secure by United States Letters Patent and claim is:

1. In an engine, a crank shaft, a reciprocating piston, a wall providing a surface within which said piston moves, a piston rod connecting said crank shaft with said piston, and means for steadying said piston relative to said surface adjacent the ends of its stroke including an engageable part for engagement between said piston and wall, means for causing engagement between said parts at the ends of the piston stroke including a cam member set in the end of the piston rod and adapted to be held in place by one of said parts operative to cause the engagement of said parts.

2. In an engine, a crank shaft, a reciprocating piston, a wall providing a surface within which said piston moves, a piston rod connecting said crank shaft with said piston, a movable part for engagement between said piston and wall, and means for moving said part at the ends of the stroke of said piston including a cam insert located at the end of the piston rod, and a roller engaging therewith and carried by said movable part.

3. In an engine, a rotating crank shaft, a reciprocating piston, a member having a surface within which said piston moves, a piston rod connecting said crank shaft with said piston, and engine actuated means for steadying said piston relative to said surface adjacent the top and bottom of its stroke actuated through the changing angularity of the connecting rod and the piston, including movable parts for causing engagement between said piston and member, and a detachable insert carried in the end of said piston rod adapted to engage the movable parts and force the same into engagement between the piston and wall at the end of the piston stroke.

4. In an engine, a rotating crank shaft, a reciprocating piston, a member having a surface within which said piston moves, a wrist pin, a piston rod connecting said crank shaft with said pin, and engine actuated means for steadying said piston relative to said surface adjacent the ends of its stroke actuated through the changing angularity of the connecting rod and the piston, including a movable part for engagement between said piston and member, and a concavo-convex segmental insert carried in the end of said piston rod supported on said wrist pin, adapted to engage the movable part and force the same into engagement between the piston and wall at the end of the piston stroke.

5. In an engine, a crank shaft, a reciprocating piston, a wall providing a surface within which said piston moves, a wrist pin in said piston, a piston rod connecting said crank shaft with said wrist pin, and means for steadying said piston relative to said surface adjacent the ends of its stroke, comprising a movable part for engagement between said piston and wall, means for moving said part at the ends of the piston stroke including a movable gate carried by said piston, bearing trunnions on said gate, a roller mounted in said trunnions, and an insert carried by the piston rod and located on said wrist pin having a cam surface for engagement with said roller.

6. In an engine, a rotating crank shaft, a reciprocating piston, a member having a surface within which said piston moves, a wrist pin in said piston, a piston rod connecting said crank shaft with said wrist pin, said rod having a cut out portion at said wrist pin, and engine actuated means for steadying said piston relative to said surface adjacent the top and bottom of its stroke actuated through the changing angularity of the connecting rod and the piston, including engageable parts for engagement between said piston and member, and a concavo-convex segmental insert carried in said cut-out portion of said piston rod supported on said wrist pin adapted to engage one of said parts and force the same into engagement between the piston and wall at the end of the piston stroke.

7. In an engine, a crank shaft, a reciprocating piston, a cylinder, a piston rod connecting said crank shaft with said piston, and means for steadying said piston relative to said surface adjacent the ends of its stroke only, comprising a movable part integral with said piston for engagement with said cylinder, a detachable insert carried by the piston rod having a cam surface for engagement with said movable part of said piston operative to spread the same into engagement with said cylinder at the end of the piston stroke.

8. In an engine, a rotating crank shaft, a reciprocating piston, a wall providing a surface within which said piston moves, a piston rod connecting said crank shaft with said piston, and means for steadying said piston relative to said surface adjacent the ends of its stroke only, comprising an integral movable part on said piston for engagement with said wall formed by a transverse slit, a pair of longitudinal slits connected with said transverse slit, and an integral tongue connecting the piston with the slit portion thereof formed by transverse slits extending inwardly from said longitudinal slits, and means for moving said piston part at the ends of the piston stroke into engagement with said wall said means including a camming member.

9. In an engine, a crank shaft having a crank, a cylinder, a piston, a piston rod connecting said piston with said crank and an integrally movable part formed in the skirt of said piston and hinged to have a substantially rectilinear movement toward and away from the center of the piston and a detachable cam insert carried by said piston rod, adapted to engage said movable part and cause engagement thereof with the cylinder at the end of the piston.

10. In an engine a crank shaft, a reciprocating piston, a cylinder, a piston rod connecting the crank shaft and piston, an integrally movable gate on said piston formed by providing a transverse slit in the wall of said piston, a pair of longitudinal slits connecting said transverse slit, a pair of inwardly extending transverse slits at the opposite ends of said longitudinal slits terminating at a spaced distance, and a pair of longitudinal slits extending towards said first mentioned transverse slit from the terminals of said second mentioned pair of transverse slits, a bearing located in said gate adjacent the end of said last mentioned longitudinal slits, a cam engaging element mounted in said bearing and a cam member carried by said piston rod engaging said member and adapted to force said gate against the cylinder at the end of the piston stroke.

11. In means for preventing piston slap, the combination of a piston head having a depending wall with expansible portions; a casing in which said piston is adapted to have movement; a piston rod attached to the piston and separable camming members positioned intermediate the piston rod and the expansible walls of said piston; said camming members being effective to distend the piston wall at the ends of the piston stroke, one of said members being a rotatable bearing surface.

12. In a piston construction, the combination of a piston having a depending wall; a piston rod pivotally mounted intermediate said wall; a camming member mounted on said piston rod; a roller mounted on said wall and adapted to cooperate with said camming member, said wall being yieldable adjacent said roller.

13. In a piston construction, the combination of a piston having a depending wall; a head and piston rod pivotally attached to said wall; and means for transmitting power from said piston rod to said wall, said means including an interengaging roller and a cam attached to the rod and wall and positioned therein between.

In testimony whereof, I affix my signature.

CHARLES Y. KNIGHT.